United States Patent [19]

Disselbeck et al.

[11] Patent Number: 5,599,606

[45] Date of Patent: *Feb. 4, 1997

[54] SHEET-LIKE SANDWICH MOLDING

[75] Inventors: Dieter Disselbeck, Bad Soden am Taunus; Dieter Stahl, Kriftel, both of Germany

[73] Assignee: Hoechst Aktiengesellschaft, Germany

[ * ] Notice: The term of this patent shall not extend beyond the expiration date of Pat. No. 4,631,221.

[21] Appl. No.: 83,023

[22] Filed: Jun. 25, 1993

Related U.S. Application Data

[63] Continuation of Ser. No. 225,003, Jul. 27, 1988, abandoned, which is a continuation of Ser. No. 62,217, Jun. 15, 1987, abandoned, which is a continuation of Ser. No. 910,145, Sep. 22, 1986, abandoned, which is a continuation of Ser. No. 719,349, Apr. 3, 1985, Pat. No. 4,631,221.

[30] Foreign Application Priority Data

Apr. 5, 1984 [DE] Germany .......................... 34 12 846.8

[51] Int. Cl.$^6$ .................................................. B32B 3/00

[52] U.S. Cl. .......................... 428/156; 428/166; 428/171; 428/178; 428/179; 428/182; 428/186; 264/257; 264/259; 264/292

[58] Field of Search .................................... 428/156, 166, 428/171, 178, 179, 182, 186, 284, 254; 264/259, 257, 292

[56] References Cited

U.S. PATENT DOCUMENTS 4,631,221 12/1986 Disselbeck .......................... 428/166

FOREIGN PATENT DOCUMENTS 2325503 2/1988 France .

*Primary Examiner*—Leszek Kiliman
*Attorney, Agent, or Firm*—Connolly & Hutz

[57] ABSTRACT

A sheet-like sandwich molding having two outer rigid covering layers and, as the core, at least one sheet-like structure of fiber material, which has been deformed by deep-drawing and been provided with synthetic resin. The sheet-like structure of fiber material, constituting the core, can, for example, be a knitted fabric provided with a curable condensation resin.

8 Claims, 1 Drawing Sheet

SHEET-LIKE SANDWICH MOLDING

CROSS-REFERENCE TO RELATED APPLICATIONS

This application is a continuation of application Ser. No. 07/225,003, filed Jul. 27, 1988, now abandoned, which in turn is a continuation of application Ser. No. 07/062,217, filed Jun. 15, 1987, now abandoned, which in turn is a continuation of application Ser. No. 06/910,145, filed Sep. 22, 1986, now abandoned, which in turn is a continuation of application Ser. No. 06/719,349, filed Apr. 3, 1985, now U.S. Pat. No. 4,631,221.

The present invention relates to a core material comprising at least one sheet-like textile fabric with deformations therein formed by deep-drawing and impregnated with synthetic resin Sandwich panels, as lightweight core laminate panels, have the advantage over conventional building materials that they combine a low weight per unit area with exceptional flexural rigidity. They conventionally consist of two relatively thin outer covering layers of a hard, firm and rigid material. These two covering layers are joined together by a relatively thick core which consists of a light and less rigid material. The bond between the core and the covering layers must be sufficiently strong that, for example, no detachment of the covering layer from the core occurs upon exposure to a force. In this respect the core materials of lightweight honeycomb, used in particular also in aircraft construction, have the disadvantage that only the thin webs of the honeycomb core material running at right angles to the covering layers are available as bonding surfaces. For many applications, for example for floor panels in aircraft, this does not permit the requisite strength characteristics to be achieved. Such is particularly the case if, for example due to flammability considerations, it is desired to use phenolic resin-bonded systems for the core and covering layers.

There therefore still remained the object of providing sheet-like sandwich moldings which, while paying regard to the usual weight minimization, have high strength characteristics and in particular also permit the use of materials which are suitable from a flammability point of view and which are not able to give more than low bonding forces between the core and covering layers, This object has been achieved, according to the invention, by the use of a core material which has been obtained by deep-drawing of at least one sheet-like structure of fiber materials provided with synthetic resin, which core material is provided with covering layers on both sides, in the conventional manner. The shaping of the sheet-like structure of fiber materials can, for example, be effected by placing the impregnated sheet-like structure in a deep-drawing mold and shaping it, with the synthetic resin being caused to cure by the heating effected at the same time. After demolding, a profile structure is obtained which, depending on the nature of the mold, exhibits, for example, deep-drawn wells of circular, quadrilateral or hexagonal cross-section, webs or geometrical structures of any other shape. The outer covering layers are then applied to the core material thus formed. The bonding between the core material and the covering layers can be effected by, for example, a resin material, e.g. a condensation resin.

By sheet-like structures of a fiber material there are to be understood the known sheet-like structures such as, for example, woven fabrics and nonwoven fabrics but especially sheet-like structures of a loop-type fabric, for example a knitted fabric. The fiber material can consist of staple fibers or a continuous filament material which has, for example, been converted to a nonwoven or been converted to staple fiber yarns which have then been further converted to a knitted fabric. The filamentous substance of the fiber materials can consist, for example, of polyacrylonitrile, polyesters or polyamides, especially aramides, or of glass fibers or carbon fibers. Where appropriate, natural fibers may also be employed.

The use of staple fiber yarns or multifilament yarns has the advantage that such yarns become substantially better impregnated by the resin materials than do, for example, monofilaments which are only able to absorb small amounts of resin on their surface. The use of multifilaments has the further advantage that the shaping of the sheet-like structure produced therefrom is in general simpler to carry out than in the case of relatively rigid monofilaments. Moreover, it is to be expected that a firmer bond can be achieved between the resin-impregnated multifilament yarns of the core and the covering layers than in the case of monofilaments, which it is necessary to embed in resin compositions at this point.

Suitable covering layers for the sheet-like sandwich moldings according to the invention are all outer panels hitherto used for sandwich constructions, such as, for example, aluminum or steel sheets, but especially synthetic resin laminates containing inserts of, for example, carbon filament fabrics or glass filament fabrics. In simpler cases, where no great strengths are expected, it is however also possible to use, for example, plywood panels and the like.

As already mentioned above, the core material can consist not only of one layer of shaped sheet-like structures provided with synthetic resin but also of a plurality of layers, which advantageously are arranged above one another or engaging into one another. The attached Figures will assist in further explaining the invention.

BRIEF DESCRIPTION OF THE DRAWINGS

FIG. 1 shows a perspective view of a possible basic construction of a sheet-like sandwich molding according to the invention while

Figure 1:
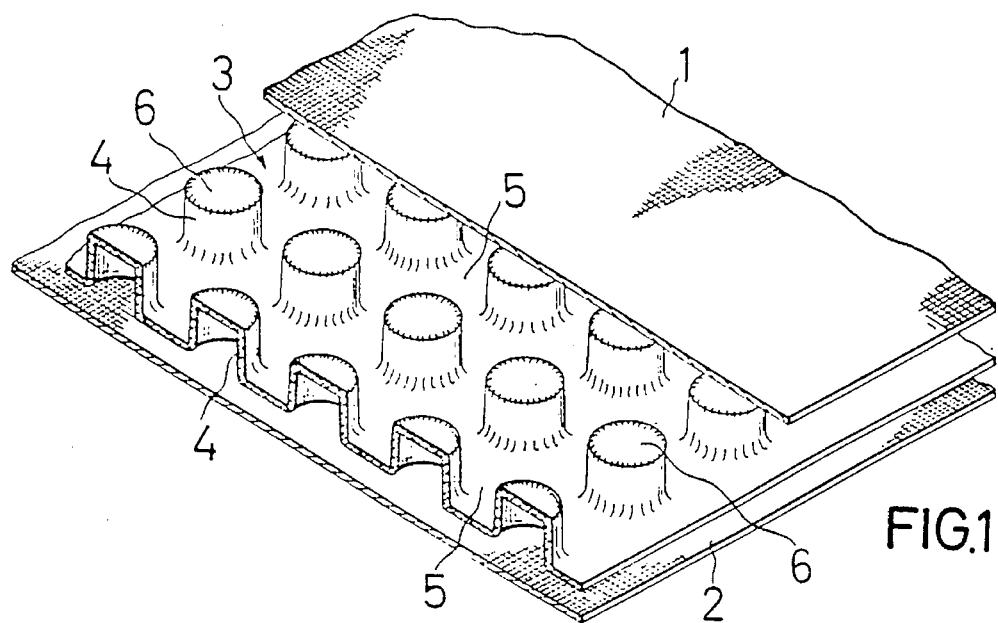

The sheet-like sandwich moldings shown in FIG. 1 consist of an upper rigid firm covering layer 1 and a corresponding lower rigid covering layer 2. For greater clarity, the individual layers in FIG. 1 are in part cut away to provide a better insight into the sheet-like sandwich molding according to the invention. The covering layers 1 and 2 could for example consist of synthetic resin laminates reinforced with glass fiber fabrics. The light core of the sandwich molding is provided by the regularly shaped sheet-like structure 3. In the case of the embodiment according to FIG. 1, the shaped sheet-like structure 3 has a plurality of regularly arranged wells 4. These wells 4 are produced by deforming the sheet-like structure 3 provided with synthetic resin. The deformation has created new surfaces 6 which run parallel to the original plane 5 of the sheet-like structure. The bonding surfaces between the rigid covering layers and the lighter core material are the contact surfaces between, for example, the upper rigid covering layer 1 and the newly formed planes 6 of the wells of the moulded sheet-like structure, on the one side, while on the other side of the sandwich molding they are the contact surfaces between the firm covering panel 2 and the remaining residual surfaces 5 of the sheet-like structure.

Figure 2:
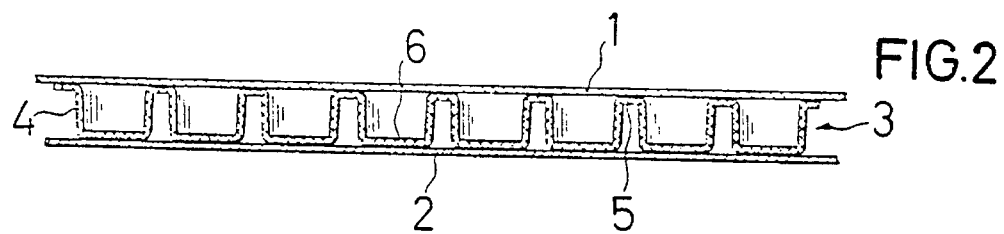
FIGS. 2 to 4 show sections through such sandwich moldings.
Figure 3:
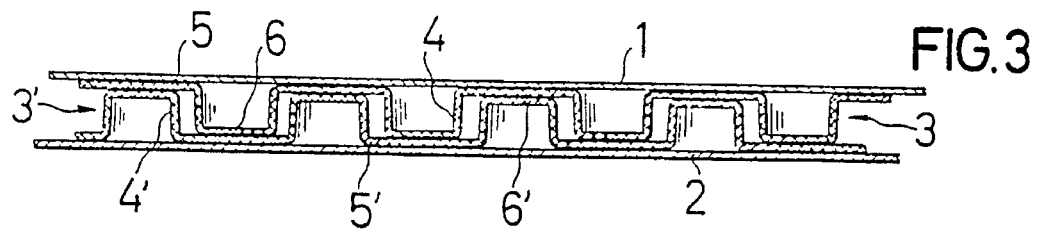
Figure 4:
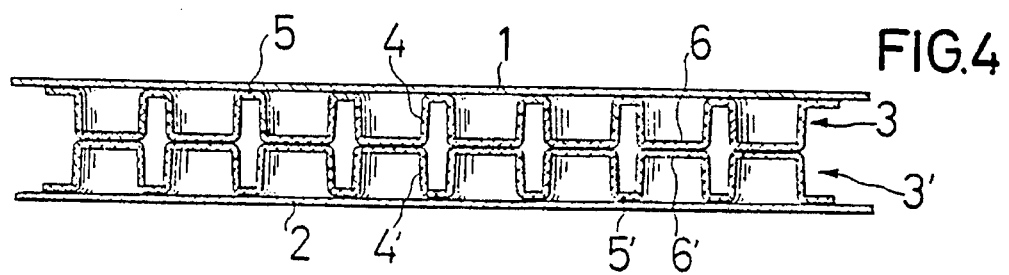

FIGS. 2, 3 and 4 show possible spatial types of arrangement of the core material. FIG. 2 shows the same situation as in FIG. 1, but in cross-section. Two rigid covering layers 1 and 2 are bonded to one another via a molded sheet-like structure 3. The molded sheet-like structure 3 has, as contact surfaces, firstly the newly formed surfaces 6 of the individual wells and, on the other side, the remaining residual portions of the original plane 5 of the sheet-like structure 3. The bond between the upper covering layer 1 and the molded sheet-like structure 3 are formed by the contact surfaces between the upper covering layer 1 and the residues, remaining after molding, of the original plane 5 of the molded sheet-like structure 3. On the other side, the bond is formed between the lower covering layer 2 and the deformed sheet-like structure 3, acting as the core layer, by the contact surfaces between the lower covering layer 2 and the new planes 6 of the wells 4 which are produced by deforming the sheet-like structure 3.

In contrast to FIG. 2, FIGS. 3 and 4 show sheet-like sandwich moldings in cross-section, in which the core layer consists of two molded sheet-like structures 3 and 3'. In the embodiment according to FIG. 3, the molded sheet-like structures 3 and 3' are arranged engaging with one another and accordingly give a particularly firm and rigid embodiment of the core. Such sandwich moldings are distinguished by a narrow, very rigid core, and naturally it is necessary, for achievement of optimum strength, to ensure adequate bonding of, for example, the new surfaces 6 of the well-shaped deformations to the residual planes 5' of the second sheet-like structure 3' and, of course, to the corresponding covering layer 2. Corresponding remarks apply to the upper covering layer and to its bonding to the individual molded portions of the sheet-like structures 3 and 3'.

FIG. 4 shows a lighter-weight embodiment of the core material, also employing two molded sheet-like structures 3 and 3'. In this embodiment, the bond between the covering layers 1 and 2 is provided by the contact surfaces of these covering layers with the residual surfaces of the original planes 5 and 5', while the central bond must be provided by a corresponding bonding of the newly created planes 6 and 6' in the middle of the core. Such bonds can be achieved by, for example, the use of appropriate resin systems.

In the Figures mentioned, the deformations have in each case been depicted as circular wells. Of course, other deformations are also conceivable, for example of quadrilateral or honeycomb-shaped cross-section.

Using the core material according to the invention it is possible, given the available spectrum of variation in selection of the materials, to provide inexpensive embodiments of the sandwich systems optimally adapted to the particular requirements. The particular advantage of the sandwich molding according to the invention is that the size of the bonding surfaces can be selected within a wide range. It can, for example, constitute 30, 40 or even 50% of the total surface area of the firm covering layer. This means that if the sandwich panel is subjected to compressive stress the forces occurring at the interface between the core and the covering layer can be securely absorbed without any creasing or detachment of the covering layer. This, for example, also makes it possible to use phenolic resin systems reinforced with glass fibers or carbon fibers, which systems present bonding problems but because of their flammability characteristics are of especial interest for interior components of aircraft.

In contrast thereto, the lightweight core materials frequently used in aircraft construction which consist of hollow bodies in the form of lengths of tube of honeycomb cross-section offer only very small bonding surfaces. In such systems, it is in fact only the wall thickness of the honeycombs which is available; in known embodiments this constitutes at most 10% and is therefore insufficient for the use of fiber-reinforced phenolic resin systems for bonding the core layer to the covering layers. In contrast, with a core material according to the invention it is possible to provide lightweight sandwich panels which consist entirely of a glass fiber-reinforced phenolic resin system and accordingly exhibit excellent flammability properties and moreover can be manufactured relatively inexpensively.

A further advantage of the core material according to the invention is that it can be three-dimensionally deformed and thus also permits the manufacture of curved sheet-like moldings without the use of a special cutting-to-shape technique. The sheet-like structures of fiber materials, molded according to the invention, can for example be directly placed on patterns and then be converted in this state, under stress, together with the covering layers and an appropriately suited resin system to give, for example, a bent sheet-like molding.

To produce sandwich moldings having particularly high strengths it is necessary to effect the deformation of the sheet-like structures of fiber material in such a way that this deformation takes place at least in one direction at right angles to the original plane of the sheet-like structure of fiber material, The deformations should have the shape of wells or webs or the like and accordingly these deformations should in each case exhibit new planes which run parallel to the original plane of the sheet-like structure. In the attached FIGS. 1 to 4, the wells shown there conform to this requirement. To achieve highest possible strengths, the number, size, shape and spatial arrangement of the individual deformations of the sheet-like structure should be so selected that the contact surfaces of the molded sheet-like structure with the covering layers and the contact surfaces of the molded sheet-like structures with one another, where a plurality of such structures is employed as the core material, are a maximum. It is, in fact, an advantage of the material according to the invention that the core material does not consist of open tube systems cut into lengths, or the like, but of a sheet-like material deformed in the shape of, for example, wells, i.e. a material which permits a substantially larger contact surface between the core material and the covering layers than in the previously known systems of hollow structures.

Further capability of varying the construction of the sandwich moldings according to the invention results from appropriate selection of a suitable sheet-like structure of fiber material. As already mentioned above, molded sheet-like structures of a knitted fabric of multi-filament threads or fiber yarns are particularly preferred. It is however also possible to employ woven fabrics or, for example, spun-bonded nonwovens. Under these circumstances, substantial deformation of the sheet-like structures of fiber material is in most cases not possible, since such sheet-like structures present very great resistance to such deformation. If a very high temperature is chosen for deformation and/or deep-drawing, so that flow of the fiber materials employed can already occur or is no longer avoidable, worsening of the physical properties of the sheet-like structure and accordingly also of the physical properties of the core layer of the sandwich molding must frequently be expected. Preferred embodiments of the molding according to the invention should therefore preferably not contain, in the sandwich core, any fibers or filaments which are modified by heat exposure during deformation, In lightweight sandwich constructions, where what requires attention is not the maximum strength but rather, example, the light weight of the bulky molding produced, it is not necessary to ensure a particularly high proportion of the surface in the contact planes. In such cases it is readily possible to dispense with making the contact surfaces of the deformed sheet-like core structures particularly large. Instead of well-shaped deformations it is thus possible, for example, to employ conical deformations or to use materials which have not been deformed in one direction only but also parallel thereto, in the opposite direction. Sandwich moldings which have been produced using such core materials admittedly have a lower strength but on the other hand possess a particularly low weight per unit volume.

We claim:

1. A core material comprising at least one textile woven or loop fabric of fiber material in the form of a sheet, the textile fabric having deformations therein formed by a deep-drawing process to thereby prestress the fiber material so deformed, the deformations having surrounding side walls, cured synthetic resin impregnating the fiber material, and openings between the resin impregnated fiber material extending over the stressed side walls of the deformations formed during the deep-drawing process.

2. A core material as in claim 1 wherein the openings are numerous.

3. A core material as in claim 1, wherein the core material consists of two or more spaced apart textile fabrics of fiber material each in the form of a sheet deformed by deep-drawing in a pattern of deformations where the deformations are generally equally spaced apart, and each textile fabric being impregnated with synthetic resin and arranged in layers above one another.

4. A core material as in claim 1 wherein the textile fabric of fiber material is a knitted fabric.

5. A core material as in claim 1 wherein the deformation of the textile fabric material is effected in at least one direction at right angles to the original plane of the textile fabric of fiber material, the deformations being in the shape of wells or webs, each having a new plane which runs parallel to the original plane of the textile fabric.

6. A core material as in claim 1 wherein the core material consists of two or more spaced apart textile fabrics of fiber material each in the form of a sheet deformed by deep-drawing in a pattern of deformations where the deformations are generally equally spaced apart, and each textile fabric being impregnated with synthetic resin and arranged in layers interdigitated with one another.

7. A core material as in claim 1 wherein the resin is a condensation resin.

8. A core material as in claim 5 wherein the number, size, shape and spatial arrangement of the deformations of at least one textile fabric are selected to form contact surfaces.

* * * * *